(12) United States Patent
Liu et al.

(10) Patent No.: US 7,031,028 B2
(45) Date of Patent: Apr. 18, 2006

(54) OPTICAL SCANNER EQUIPPED WITH PLUG-IN CALIBRATION FILM

(76) Inventors: Rong-Ji Liu, No.3, Ln.422, Sec.1, Wen Hsin Rd., TaiChung (TW); Wen-Chao Tseng, No.56, MingChu St., WuFang Hsiang, TaiChung (TW)

( * ) Notice: Subject to any disclaimer, the term of this patent is extended or adjusted under 35 U.S.C. 154(b) by 822 days.

(21) Appl. No.: 09/978,138

(22) Filed: Oct. 15, 2001

(65) Prior Publication Data

US 2003/0072039 A1    Apr. 17, 2003

(51) Int. Cl.
*H04N 1/04*   (2006.01)
*H04N 1/00*   (2006.01)
*H04N 1/46*   (2006.01)

(52) U.S. Cl. ............ 358/406; 358/475; 358/497; 358/483; 358/474; 358/505; 358/506

(58) Field of Classification Search .......... 358/475, 358/497, 406, 483, 474, 505, 506
See application file for complete search history.

(56) References Cited

U.S. PATENT DOCUMENTS

| | | | |
|---|---|---|---|
| 5,798,849 A * | 8/1998 | Tsai | 358/475 |
| 6,252,998 B1 * | 6/2001 | Tsai | 382/298 |
| 6,687,024 B1 * | 2/2004 | Short et al. | 358/474 |
| 2003/0011898 A1 * | 1/2003 | Mai et al. | 359/808 |

* cited by examiner

*Primary Examiner*—Edward Coles
*Assistant Examiner*—Houshang Safaipour
(74) *Attorney, Agent, or Firm*—Berkeley Law & Technology Group, LLC

(57) ABSTRACT

An optical scanner equipped with plug-in calibration film, which the optical scanner provides light incident upon a transmission-typed document and catches the image signals of the transmission-typed document by an optical chassis. The optical scanner equipped with plug-in calibration film includes a scanning zone and at least one attachment. The scanning zone is capable of providing for placing the transmission-typed document. The attachment is capable of providing a calibration film for enabling the optical chassis to retrieve the image signals so as to improve the image brightness.

11 Claims, 16 Drawing Sheets

OPTICAL SCANNER EQUIPPED WITH PLUG-IN CALIBRATION FILM

FIELD OF THE INVENTION

The present invention relates an optical scanner, especially to a kind of optical scanner is capable of equipping with plug-in calibration film.

BACKGROUND OF THE INVENTION

High technologies are progressed abruptly, especially for the technology of manufacturing processes of micro-electronic product, so computer is prevalent into every family and enterprise and becomes an indispensable electronic product in modern lives. Following the popularity of computer multi-media, it is required more peripheral products for input and output. The technologies of optical-electronics and semiconductor are improved daily such that the product technology of relative peripheral devices of computer such as optical scanner etc. are sophisticated daily and make the optical-electronic devices be more and more popularized and have already become required products among peripheral devices of computer. Wherein, the optical scanner has further become an important peripheral device of input and output for computer. The optical scanner mainly applies a light source module to provide light source for scanning document, and also applies an optical-path device to receive reflective document image during the scanning procedure of the light source module. Again, the document image is retrieved by the charge-coupled device and converted into digital signals through an optical-electronic transformation. Finally, the digital signals are transferred into computer for proceeding image treatment.

Please refer to FIG. 1A, which is an illustration of three-dimensional structure of an embodiment of an optical scanner of typical flatbed type with upper lamp module commonly seen in current market. Mainly, a document window glass 12 is arranged at upper side surface of the outer shell 11 of an optical scanner 1 for placing a reflection-typed document (not shown). An optical chassis 14 is driven by a driving apparatus 13 to make a linear motion along the direction of a guiding rod 15 inside a hollow outer shell 11 to proceed an image scanning job on a reflection-typed document (not shown) placed on the document window glass 12. The document window glass 12 may be placed by a transmission-typed document 31 or a transparency-placing frame 3 arranged with a plurality of transmission-type documents 31. An upper lamp module 2 from upper direction provides a light source 21 emitting light onto the transmission-typed document 31. The optical chassis 14 is driven by the driving device 13 to make linear motion along the direction of the guiding rod 15 inside the hollow outer shell 11 to proceed an image scanning job on a transmission-typed document 31 placed on the document glass window 12.

Please refer to FIG. 1B, which is an illustration of three-dimensional structure of an embodiment of an optical scanner of typical flatbed type with upper transparency cover device commonly seen in current market. Wherein the upper transparency cover device 5 is arranged with at least one lamp 51 for providing the required energy to an upper transparency cover 52. After the upper transparency cover 52 has accumulated the energy, it becomes a light source that may provide light from the upper portion incident upon the transmission-typed document 31. The document window glass 12 is placed with an auxiliary fame 6 that may prevent the light that is provided by the upper transparency cover 52 and is emitted from the upper portion from being scattering to make sufficient energy of light source be incident upon the transmission-typed document 31. Again, the optical chassis 14 is driven by the driving device 13 to make linear motion along the direction of the guiding rod 15 inside the hollow outer shell 11 to proceed an image scanning job on a transmission-typed document 31 placed on the document glass window 12.

In summarizing above description, when executing a scanning job on transmission-typed document 31, since different kind of transmission-typed document 31 has different kind of transmittance, so certain transmission-typed document 31 may show particularly clear image and also other transmission-typed document 31 may show less clear image. Therefore, how to execute an optimal result of scanning job has become an urgently pursuing solution for the relative industries and makers of optical scanners.

SUMMARY OF THE INVENTION

The main object of the present invention is to provide a kind of optical scanner equipped with plug-in calibration film. The optical scanner equipped with plug-in calibration film may provide an optical scanner to obtain the characteristics of transmission-typed documents according to the categories of changing the calibration films to achieve the functions of correction and preferable application.

To achieve above-mentioned objects, an optical scanner equipped with plug-in calibration film of the invention provides light incident upon a transmission-typed document, and catches the image signals of the transmission-typed document by an optical chassis. The optical scanner equipped with plug-in calibration film includes a scanning zone and at least one attachment.

The scanning zone is capable of providing for placing the transmission-typed document.

The attachment is capable of providing a calibration film for enabling the optical chassis to retrieve the image signals so as to improve the image brightness.

For your esteemed reviewing committee to further understand and recognize the present invention, a detailed description together with matching drawings are present as following.

DETAILED DESCRIPTION OF THE PREFERRED EMBODIMENT

The main characteristic of an optical scanner equipped with plug-in calibration film of the present invention is that the optical scanner is arranged with at least one calibration film that is changeable for achieving optimal image retrieval of transmission-document type of corrected scanning mode by the calibration film.

Figure 1A:
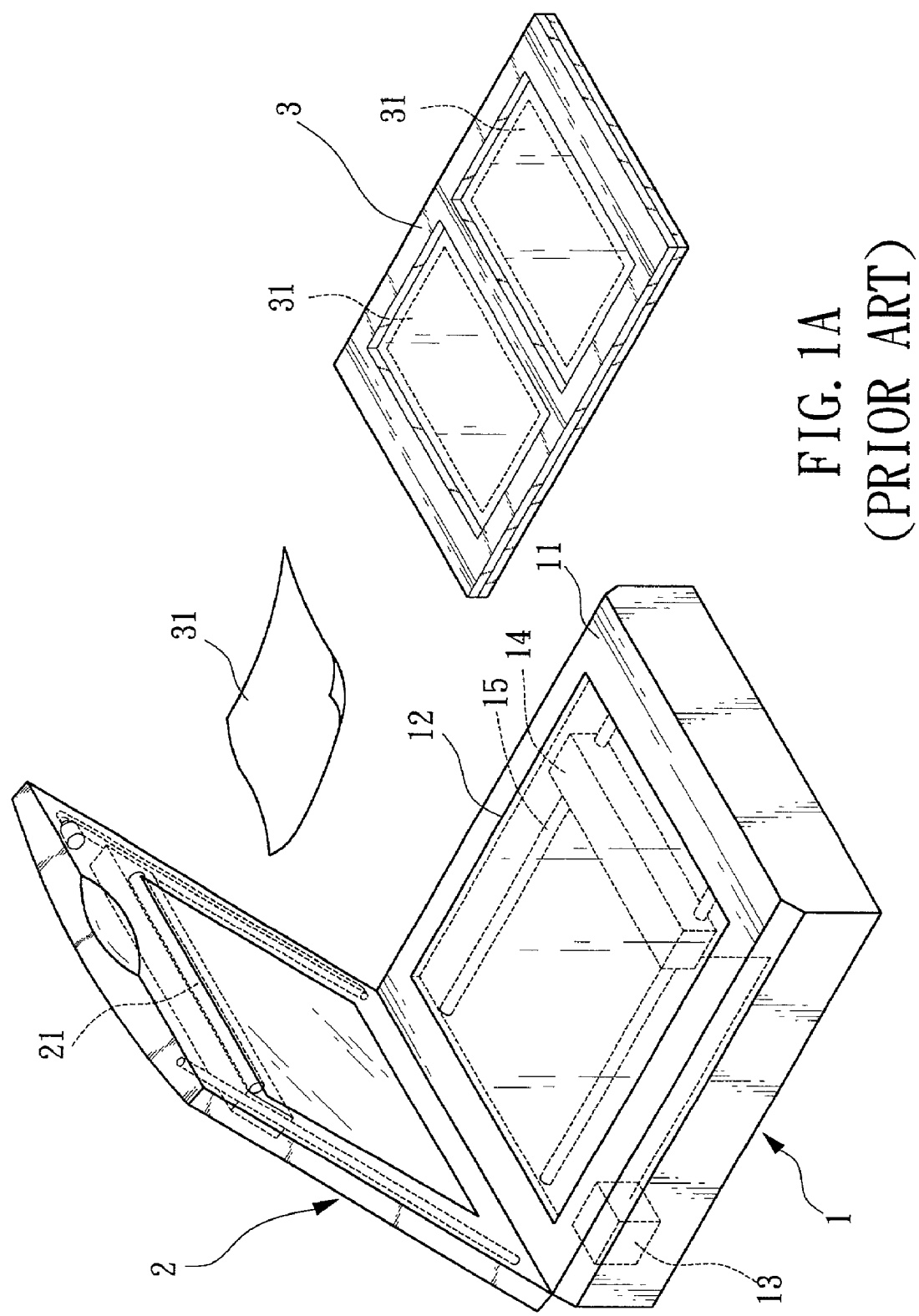
FIG. 1A is a three-dimensional structure illustration for the optical scanner of flatbed type of the upper transparency assembly of the prior art.
Figure 1B:
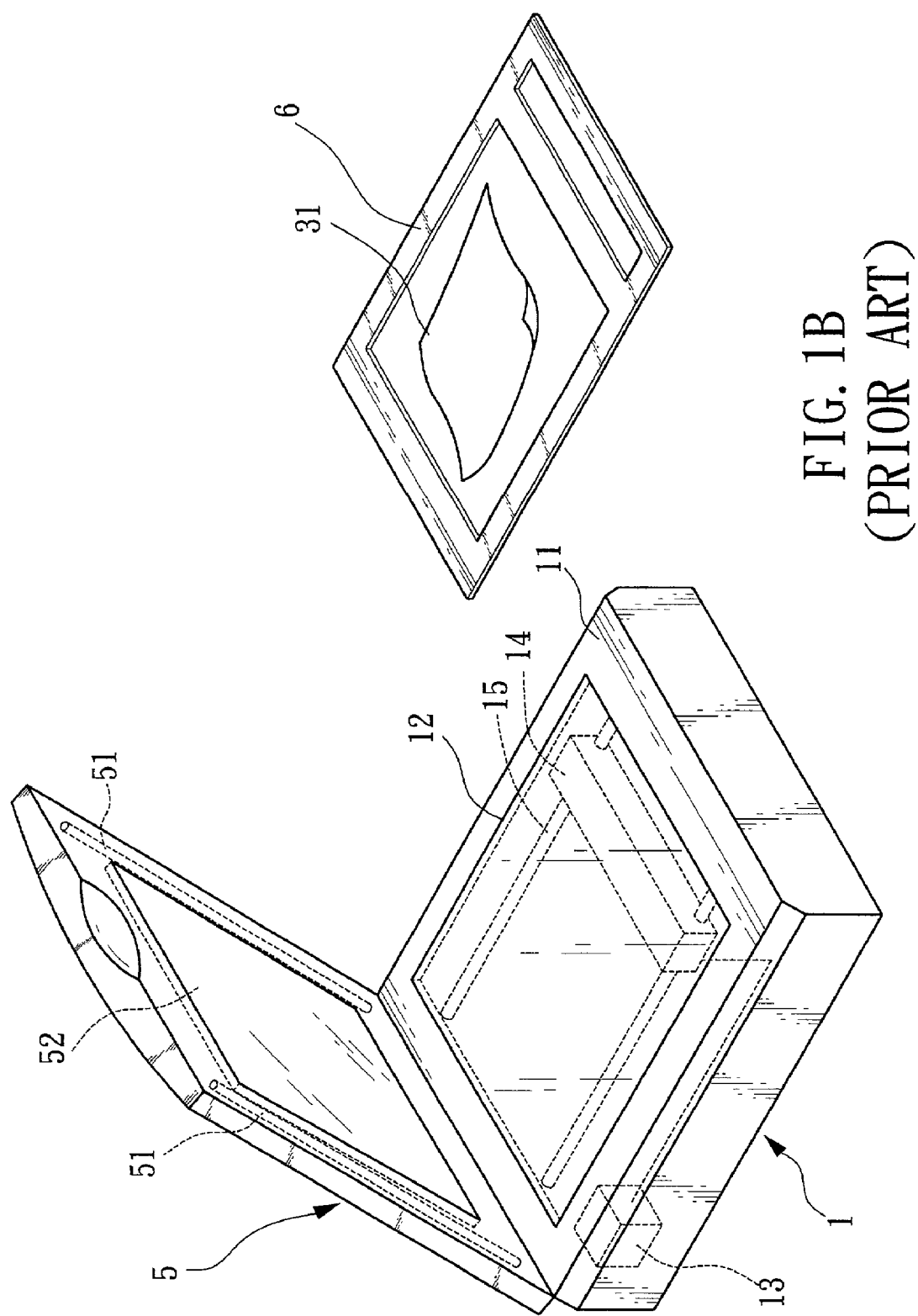
FIG. 1B is a three-dimensional structure illustration for the optical scanner of flatbed type of the upper transparency cover device of the prior art.
Figure 2A:
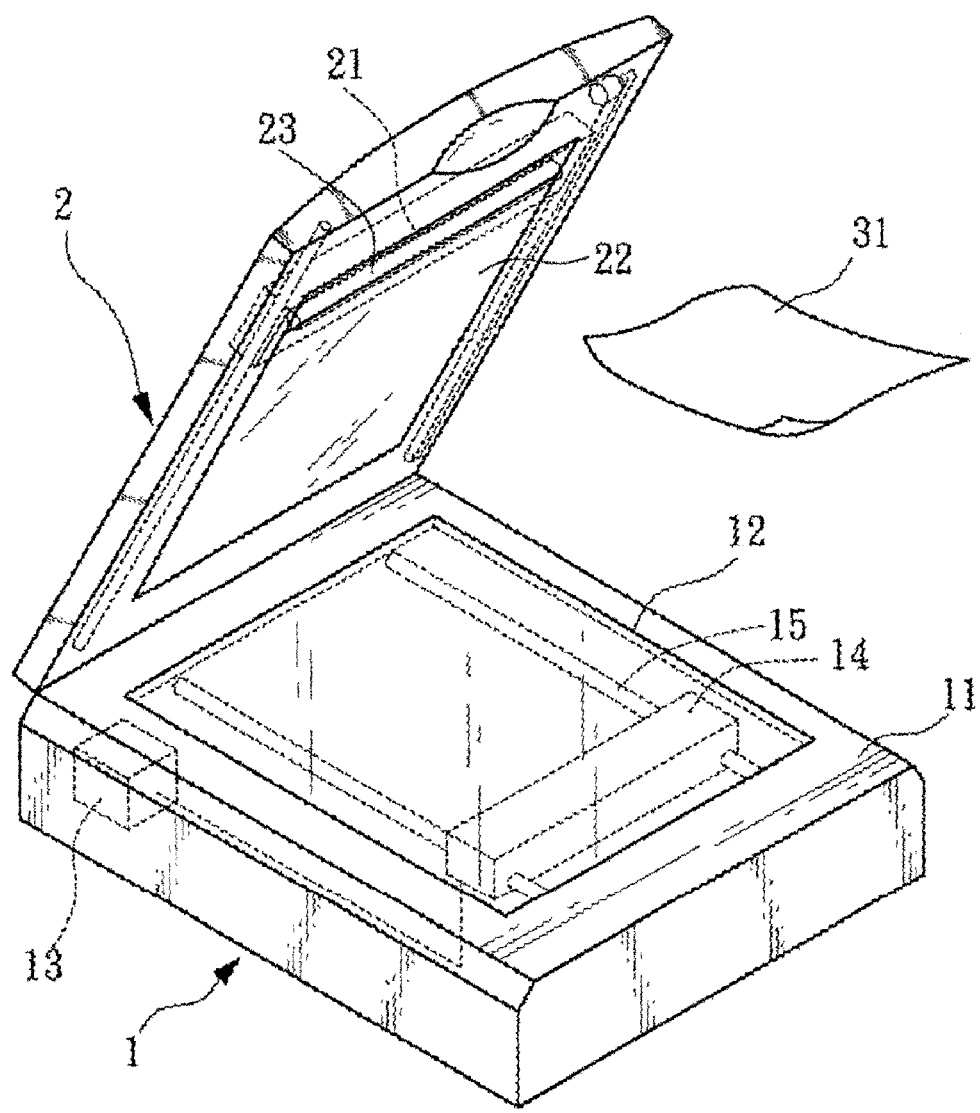
FIG. 2A is an installment illustration for the first embodiment of the optical scanner equipped with plug-in calibration film of the present invention.
Figure 2B:
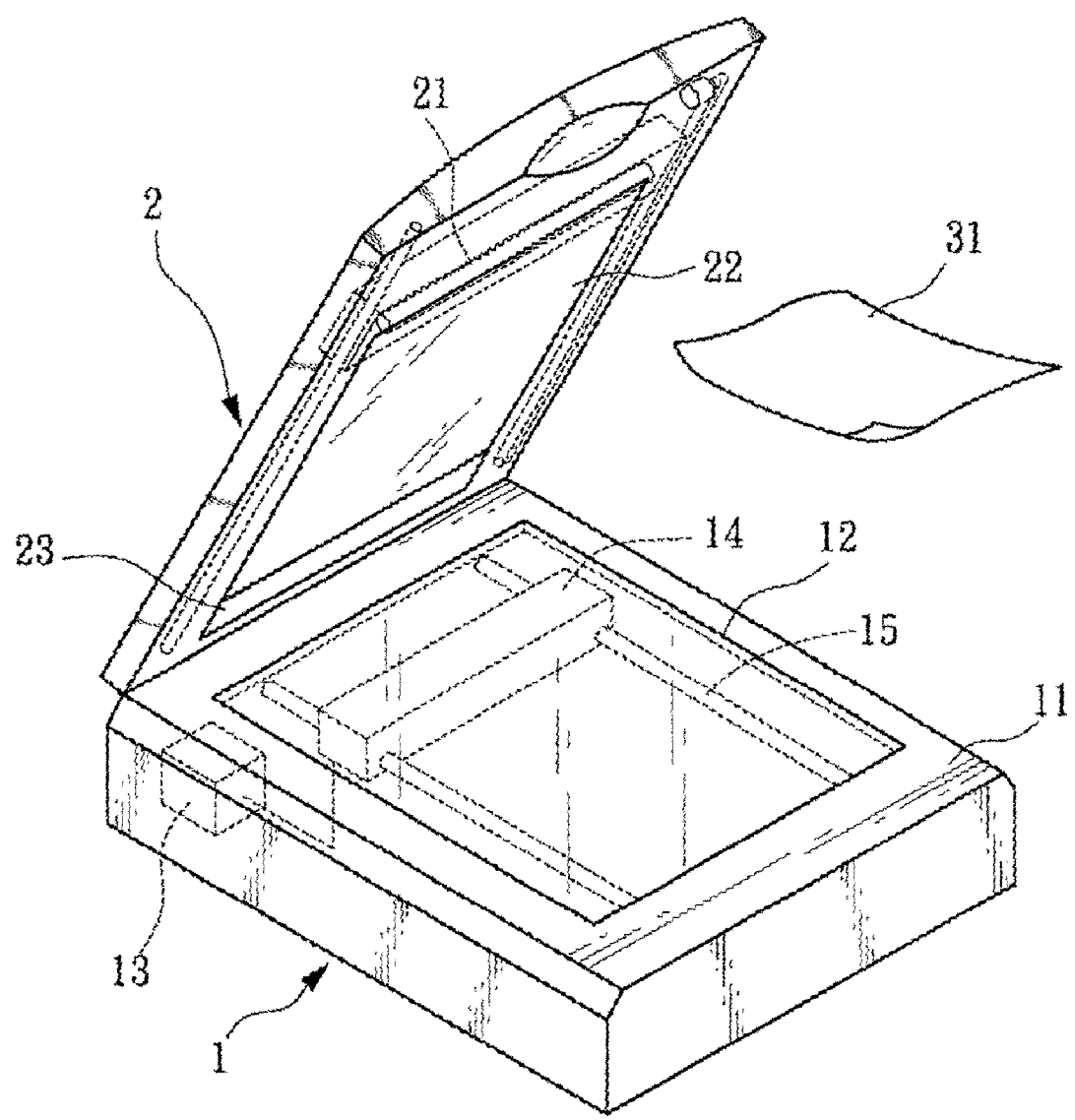
FIG. 2B is an installment illustration for the second embodiment of the optical scanner equipped with plug-in calibration film of the present invention.

Please refer to FIG. 2A and FIG. 2B, which are illustrations of preferable embodiments of the optical scanner equipped with plug-in calibration film of the present invention. The optical scanner 1 provides a light source 21 that emits light onto a transmission-typed document 31, and an optical chassis 14 to retrieve the image signals of the transmission-typed document 31. The light source is capable of providing by the upper transparency cover (not shown). The optical scanner 1 equipped with plug-in corrected film of the present invention includes a scanning zone 22 and at least one attachment 23. During the execution of scanning job of the optical scanner 1 of the invention, the upper transparency assembly 2 is pasted on the outer shell 11. Of course, a similar mechanism of the upper transparency assembly 2 may also be the mounting-light-plate module (not shown). In order to describe the present invention conveniently, the upper transparency assembly 2 is provided here for illustration, while the upper transparency cover device is well known by those who are skilled at the arts, so it won't be repetitiously described herein any more.

When the upper transparency assembly 2 is pasted on the outer shell 11, the scanning zone 22 is a zone provided for placing the transmission-typed document 31. The light emitting from the light source 21 is through the scanning zone 22 and incident upon the transmission-typed document 31. The image signals of the transmission-typed document 31 caught by the optical chassis 14. In a preferable embodiment of the invention, the attachment 23 may be arranged at one side provided for executing open for the upper transparency assembly 2. Of course, it may also be arranged relatively at the other side provided for executing rotation of the upper transparency assembly 2.

Please refer to FIG. 3A through FIG. 3D, which are illustrations of preferable embodiments for the attachments of the present invention. In these preferable embodiments of the invention, the number of the attachment 23 is one. Of course, it may also be two. When the number of the attachment 23 is one, a calibration film 4 with same transmittance as that of the transmission-typed document 31 is arranged. Before formal scanning job is executed, the optical chassis 14 first retrieves the image signals of the calibration film 4. After an image of optimal brightness is retrieved from the calibration film 4 by appropriately adjusting the optical chassis 14, a formal scanning job is then executed. When the number of the attachment 23 is two, one of the attachments 23 is arranged with a positive calibration film 41, and the other is arranged with a negative calibration film 42. Before formal scanning job is executed, the transmission-typed document 31 is firstly detected to decide whether it is a positive film or a negative film. Then, the optical chassis 14 retrieves image signals corresponding to the positive calibration film 41 or the negative calibration film 42. After an image of optimal brightness is retrieved from the calibration film 4 by appropriately adjusting the optical chassis, a formal scanning job is then executed.

Figure 3A:
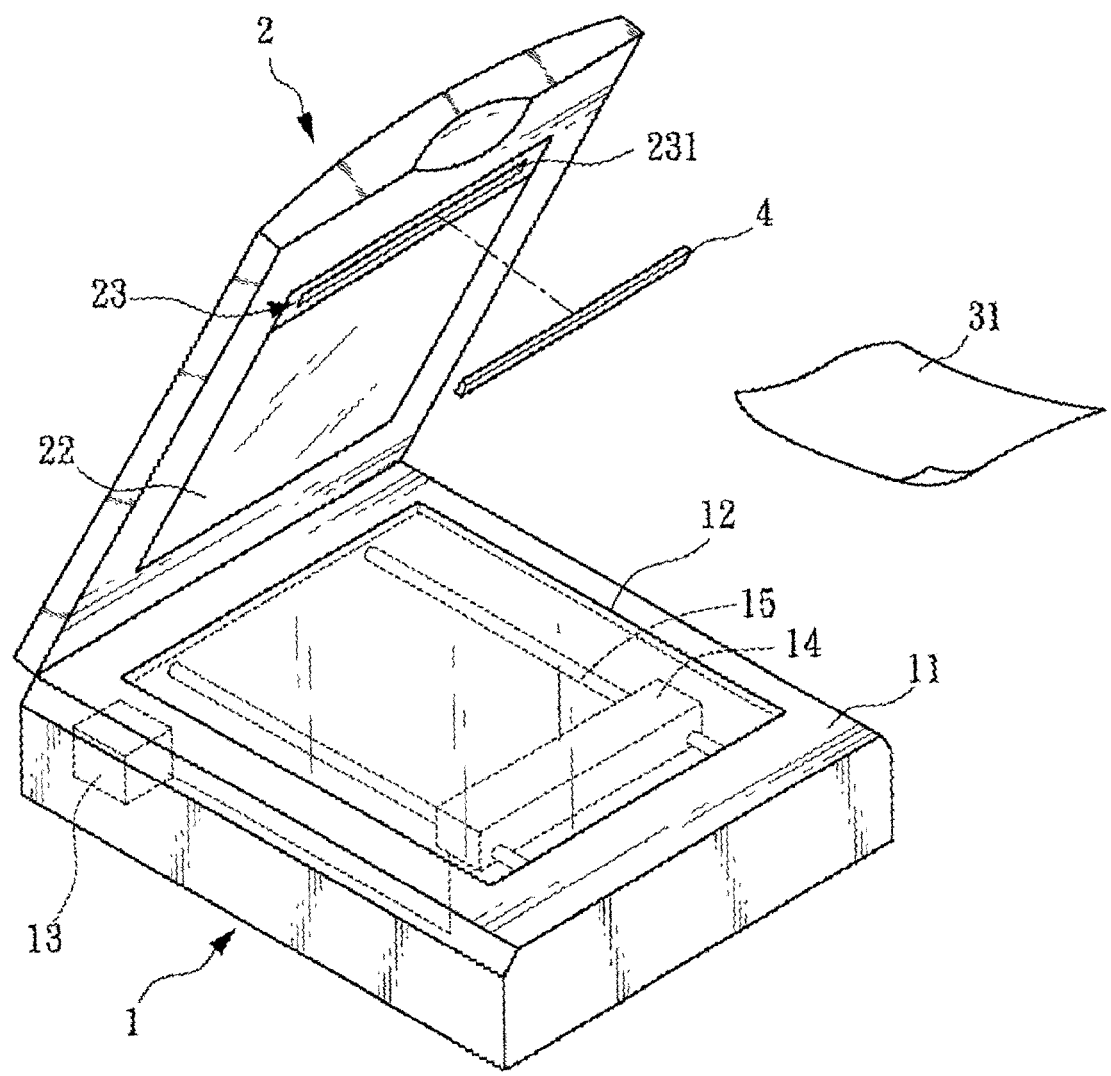
FIG. 3A is an illustration for a preferable embodiment of a single attachment with a pasting manner for the calibration film arranged in the upper transparency assembly of the present invention.
Figure 3B:
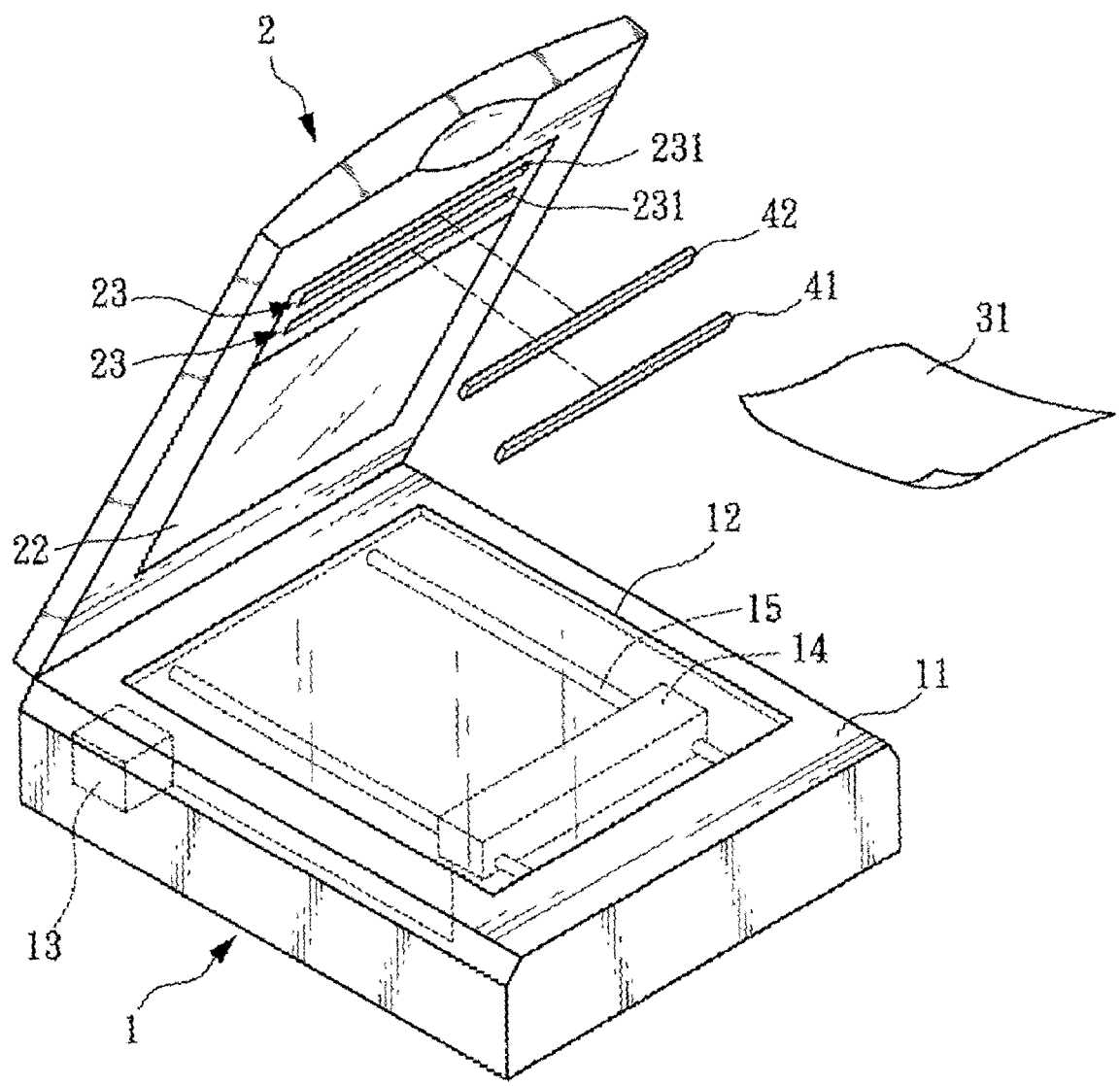
FIG. 3B is an illustration for a preferable embodiment of two attachments with a pasting manner for the calibration film arranged in the upper transparency assembly of the present invention.
Figure 3C:
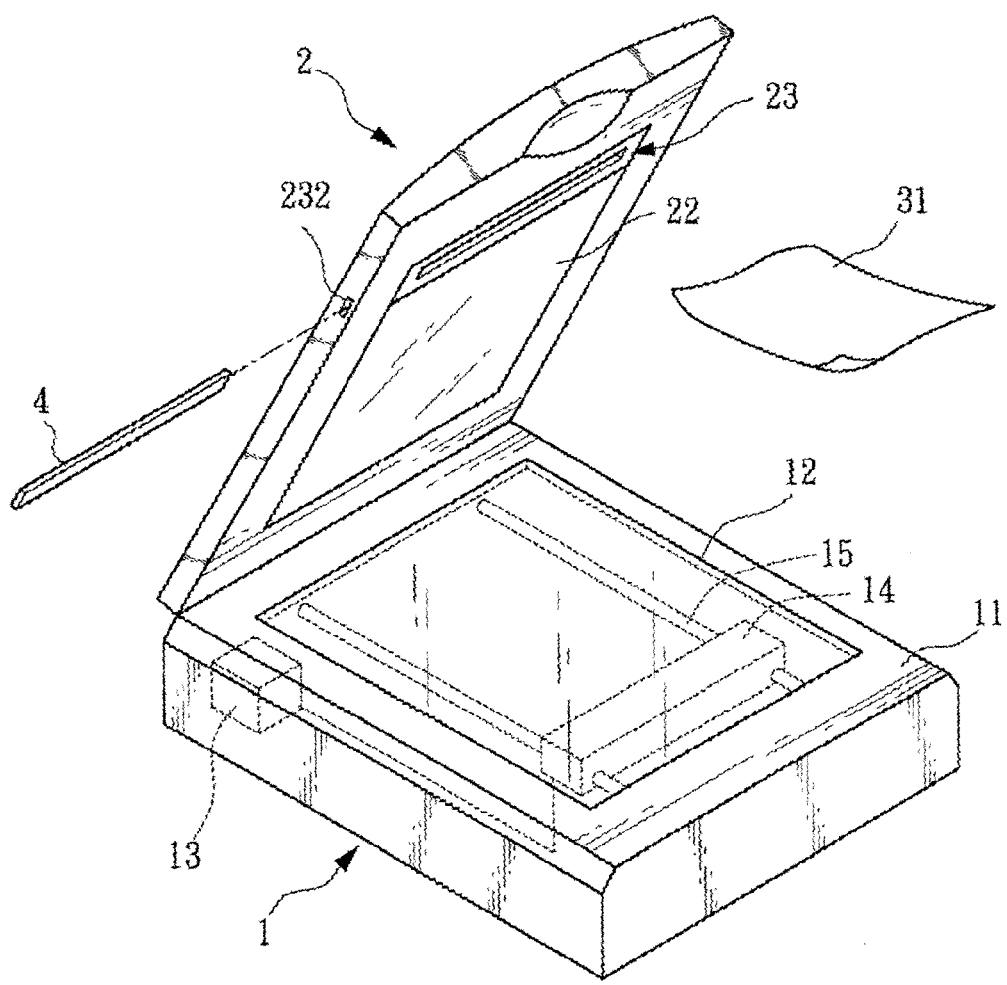
FIG. 3C is an illustration for a preferable embodiment of a single attachment with a changeable manner for the calibration film arranged in the upper transparency assembly of the present invention.
Figure 3D:
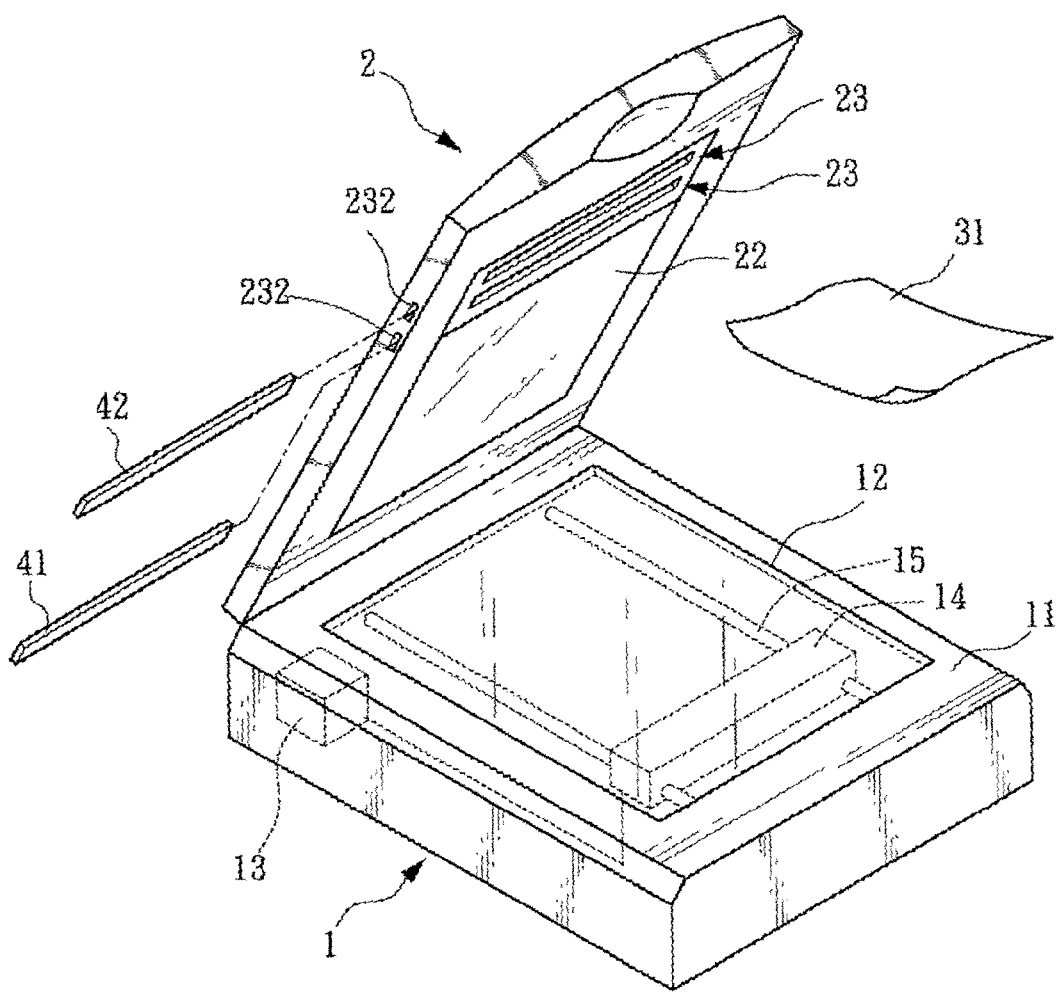
FIG. 3D is an illustration for a preferable embodiment of two pre-arranged parts with a changeable manner for the calibration film arranged in the upper transparency assembly of the present invention.

Wherein, the design of the attachment 23 may be a recess 231. The single calibration film 4 (as shown in FIG. 3A) or the positive calibration film 41 and the negative calibration film 42 (as shown in FIG. 3B) are connected with the recess 231 with the manner of pasting. Of course, in the preferable embodiments of the invention, the design of attachment 23 may also be a gliding groove 232, of which shape is matched with the calibration film 4 to provide displacement motion for the calibration film 4 inside the gliding groove 232 for achieving the function of changing.

Figure 4A:
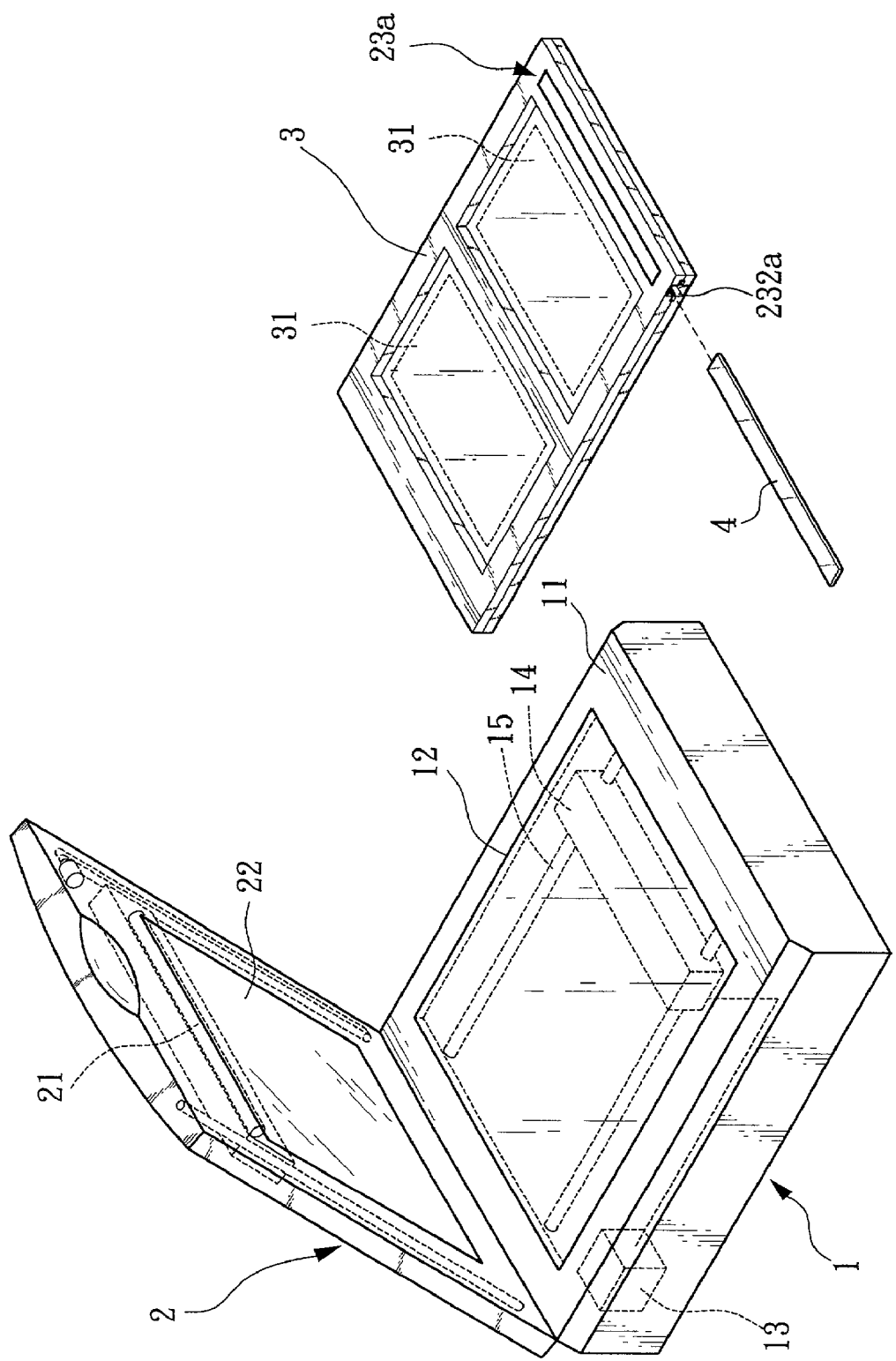
FIG. 4A is an illustration for a preferable embodiment of a single attachment with a changeable manner for the calibration film arranged in the transparency-placing frame of the present invention.
Figure 4B:
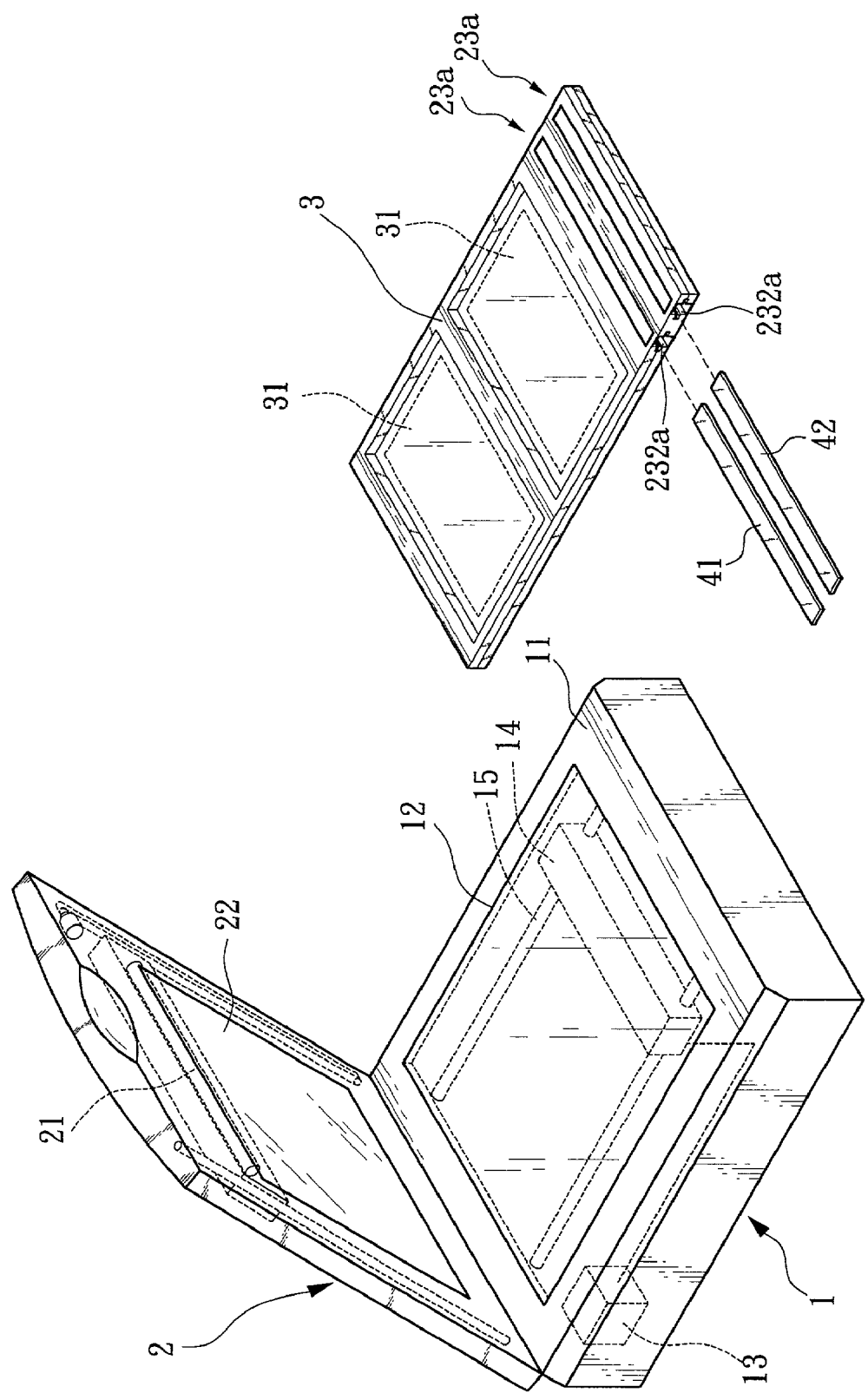
FIG. 4B is an illustration for a preferable embodiment of two attachments with a changeable manner for the calibration film arranged in the transparency-placing frame of the present invention.

Please refer to FIG. 4A and FIG. 4B, which are the illustrations for a preferable embodiment for the transparency-placing frame of the invention. In the embodiment of the invention, when the optical scanner 1 executes scanning job, a transparency-placing frame 3 is arranged between the upper lamp module 2 and the outer shell 11. The transparency-placing frame 3 is arranged with a plurality of transmission-typed documents 31. During the execution of scanning job, the optical scanner 1 provides a light source 21 that emits light incident upon the transmission-typed document 31 and catches the image signals by an optical chassis 14.

In the embodiment of the invention, the scanning zone 22 is a zone provided for placing the transmission-typed document 31. The light emitting from the light source 21 is through the scanning zone 22 and incident upon the transmission-typed document 31. The image signals of the transmission-typed document 31 caught by the optical chassis 14. The attachment 23a, arranged on the transparency-placing frame 3, may be arranged at one side provided for executing open for the upper transparency assembly 2. Of course, it may also be arranged relatively at the other side provided for executing rotation of the upper transparency assembly 2. The design of attachment 23a may also be a gliding groove 232a, of which shape is matched with the calibration film 4 to provide displacement motion for the calibration film 4 inside the gliding groove 232a for achieving the function of changing. Of course, it may also be executed with the manner of pasting. Many variations of such kinds are well known to those who are skilled at such arts, so repetitious description is no more presented herein.

In these preferable embodiments of the invention, the number of the attachment 23a is one. Of course, it may also be two. When the number of the attachment 23a is one, a calibration film 4 with same transmittance as that of the transmission-typed document 31 is arranged. Before formal scanning job is executed, the optical chassis 14 first retrieves the image signals of the calibration film 4. After an image of optimal brightness is retrieved from the calibration film 4 by appropriately adjusting the optical chassis 14, a formal scanning job is then executed. When the number of the attachment 23a is two, one of the attachment 23a is arranged with a positive calibration film 41, and the other is arranged with a negative calibration film 42. Before formal scanning job is executed, the transmission-typed document 31 is firstly detected to decide whether it is a positive film or a negative film. Then, the optical chassis 14 retrieves image signals corresponding to the positive calibration film 41 or the negative calibration film 42. After an image of optimal brightness is retrieved from the calibration film 4 by appropriately adjusting the optical chassis, a formal scanning job is then executed.

Figure 5:
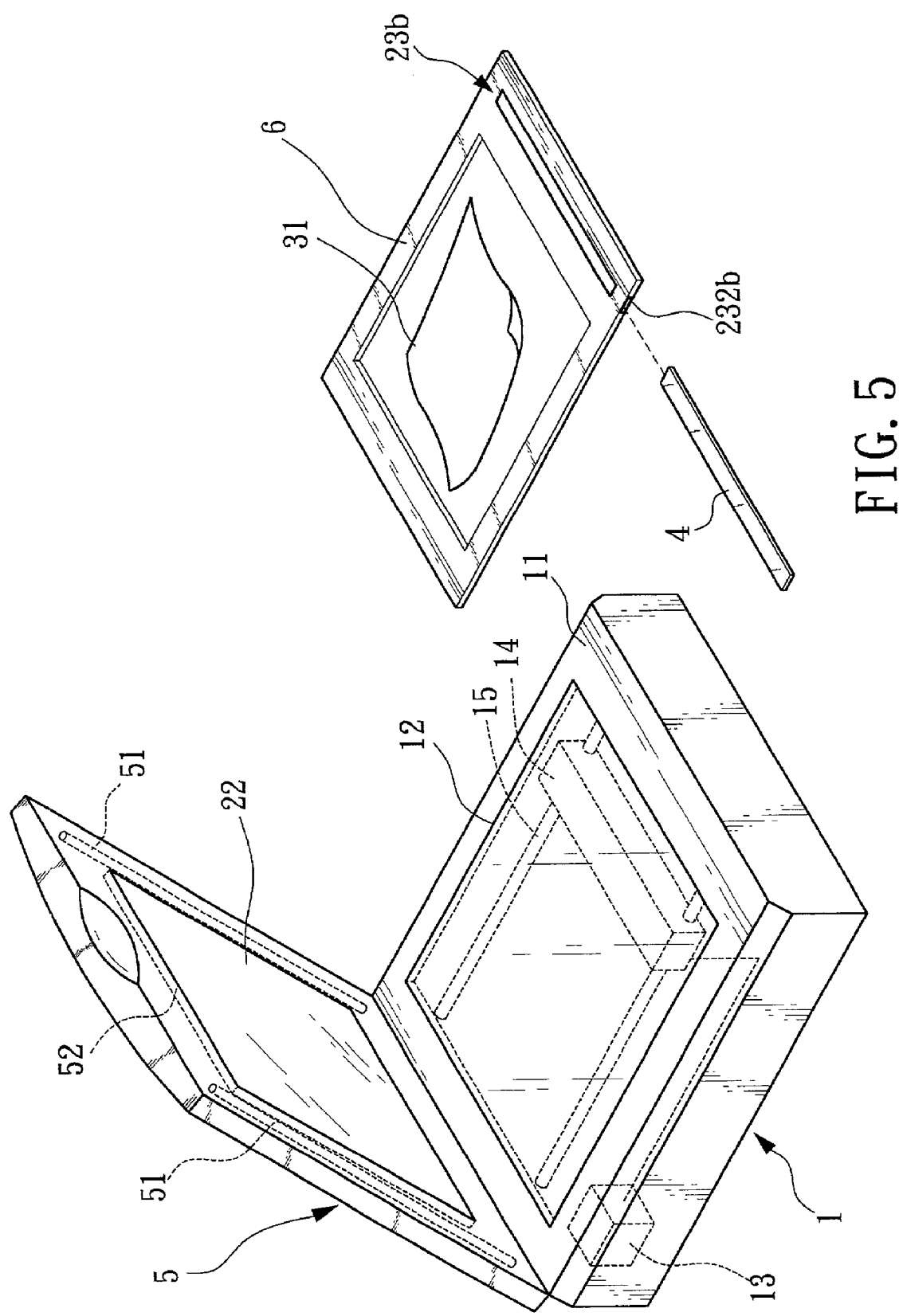
FIG. 5 is an illustration for a preferable embodiment of a single attachment with a changeable manner for the calibration film arranged in the auxiliary frame of the present invention.

Please refer to FIG. 5, which is an illustration for a preferable embodiment of a single attachment with a changeable manner for the calibration film arranged in the auxiliary frame of the present invention. In this preferable embodiment of the invention, when executing a scanning job with a upper transparency cover device 5, an auxiliary frame 6 is arranged between the upper transparency cover device 5 and the outer shell 11. The transmission-typed document 31 may be placed inside the auxiliary frame 6. The light provided by the upper transparency cover 52 is incident upon the transmission-typed document 31 and the image signals are retrieved by an optical chassis 14.

Wherein, the scanning zone 22 is a zone provided for placing the transmission-typed document 31. The light provided by the upper transparency cover 52 is through the scanning zone 22 and incident upon the transmission-typed document 31. The image signals of the transmission-typed document 31 caught by the optical chassis 14. The attachment 23b, arranged on the auxiliary frame 6, may be arranged at one side provided for executing open for the upper transparency cover device 5. Of course, it may also be arranged relatively at the other side provided for executing rotation of the upper transparency cover device 5. The design of attachment 23a may also be a gliding groove 232b, of which shape is matched with the calibration film 4 to provide displacement motion for the calibration film 4 inside the gliding groove 232b for achieving the function of changing. Of course, it may also be executed with the manner of pasting. Many variations of such kinds are well known to those who are skilled at such arts, so repetitious description is no more presented herein.

Figure 6A:
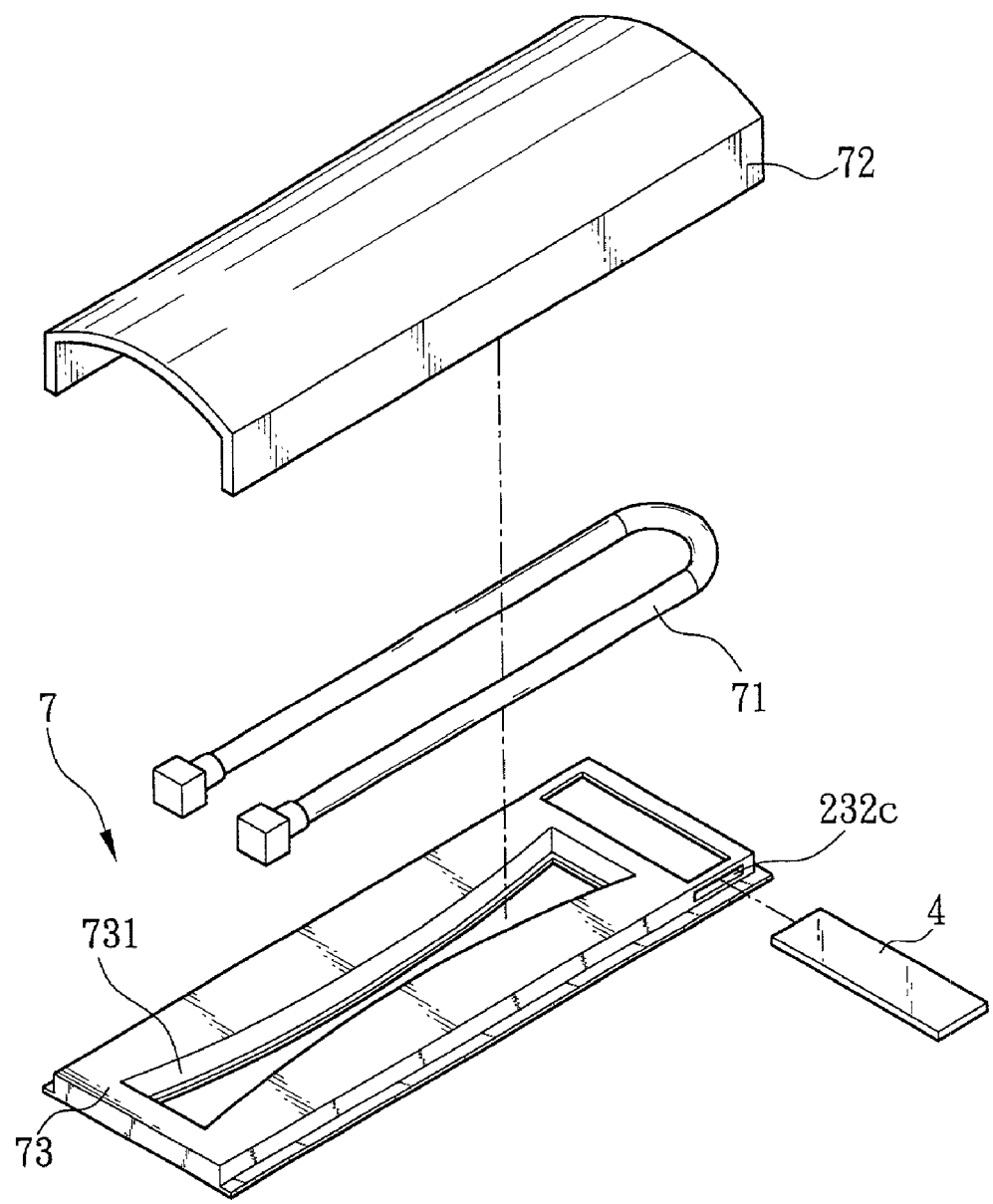
FIG. 6A is an illustration for a preferable embodiment of a single attachment with a changeable manner for the calibration film arranged in the outer shell of small mask of the present invention.
Figure 6B:
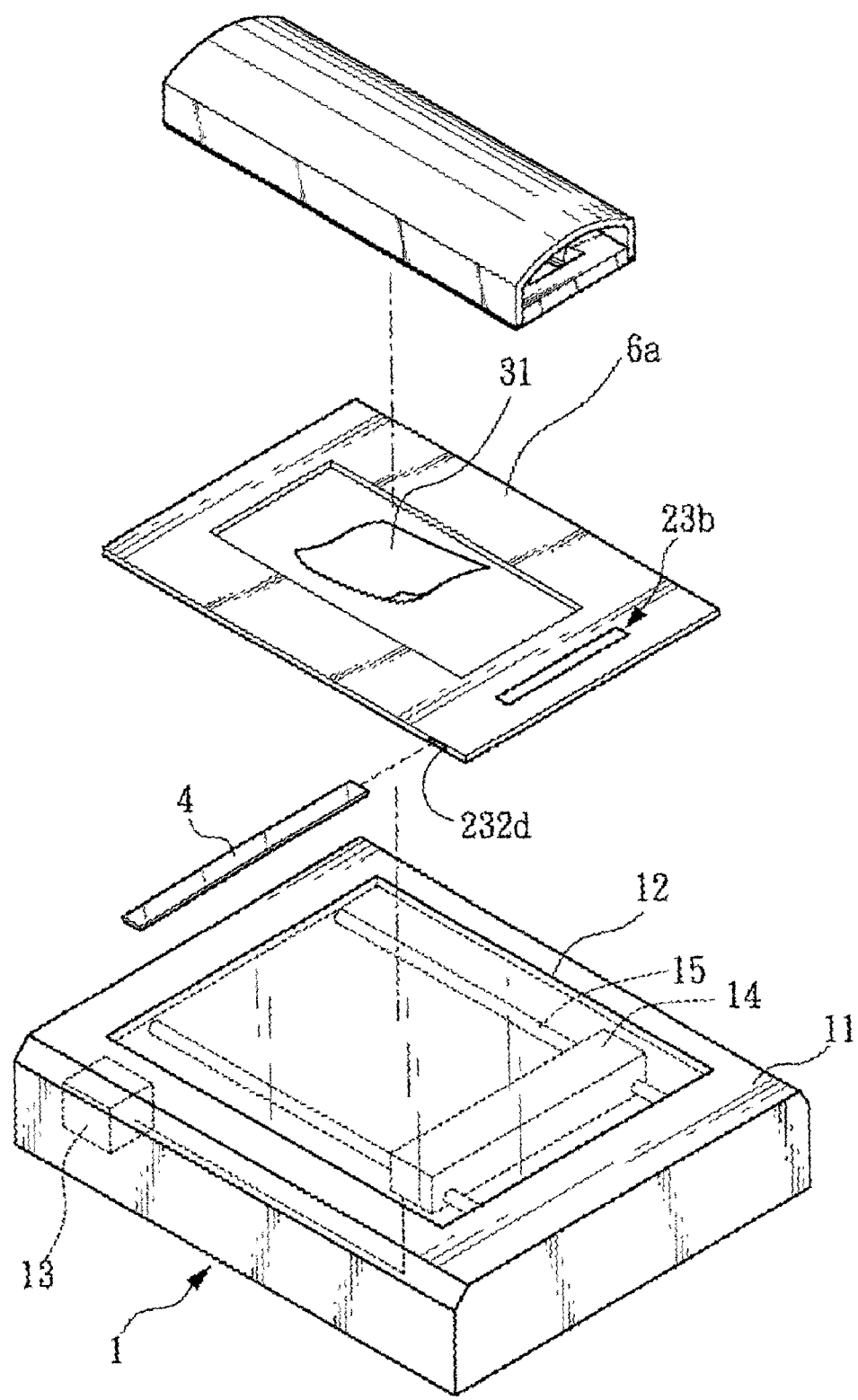
FIG. 6B is an illustration for a preferable embodiment of a single attachment with a changeable manner for the calibration film arranged in the auxiliary frame of small mask of the present invention.
Figure 7B:
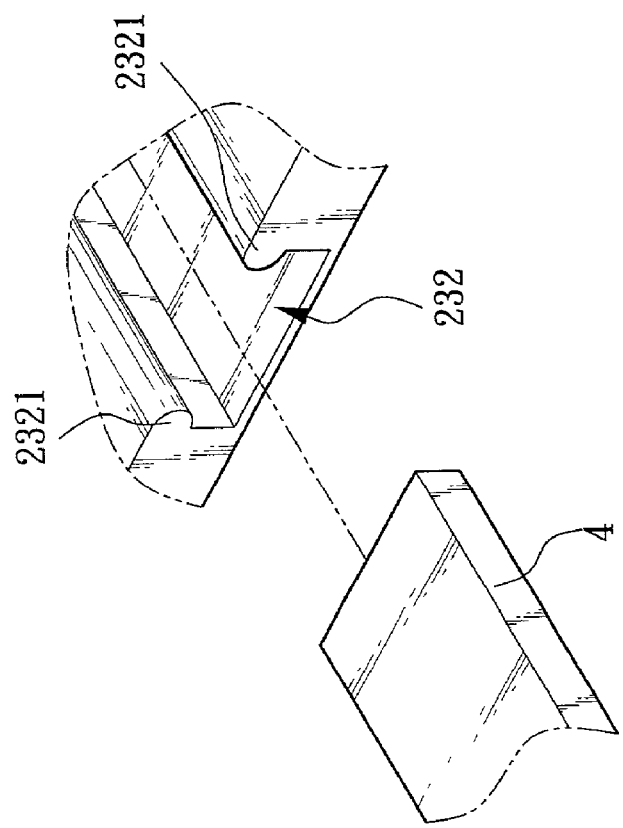
FIG. 7B is an illustration of three-dimensional structure for the second preferable embodiment of the present invention of which the gliding groove matching with the calibration film.
Figure 7A:
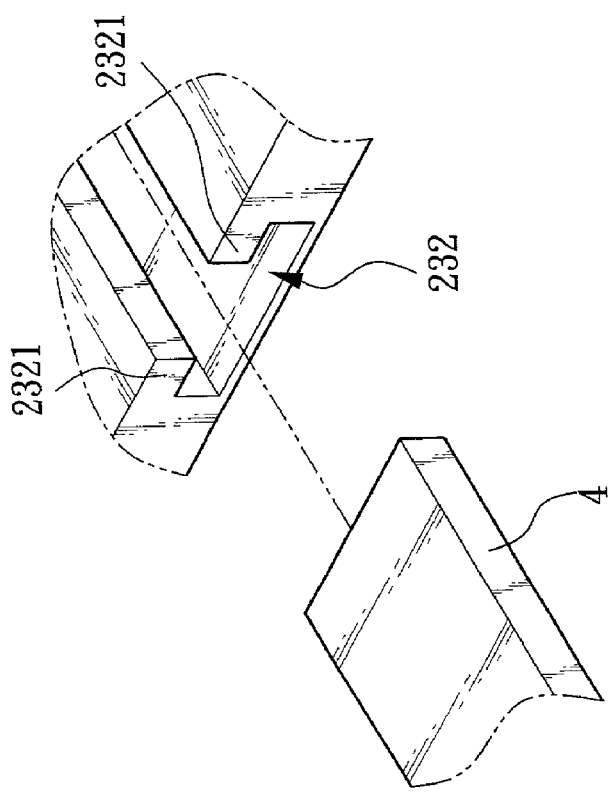
FIG. 7A is an illustration of three-dimensional structure for the first preferable embodiment of the present invention of which the gliding groove matching with the calibration film.
Figure 7D:
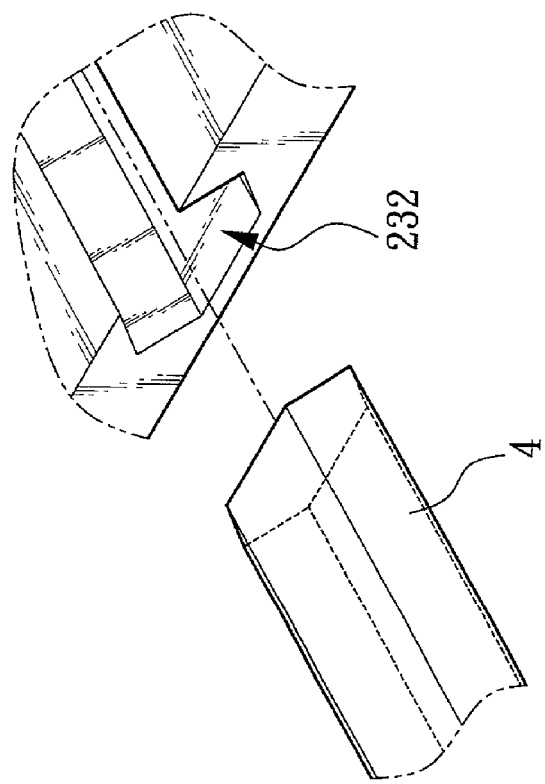
FIG. 7D is an illustration of three-dimensional structure for the fourth preferable embodiment of the present invention of which the gliding groove matching with the calibration film.
Figure 7C:
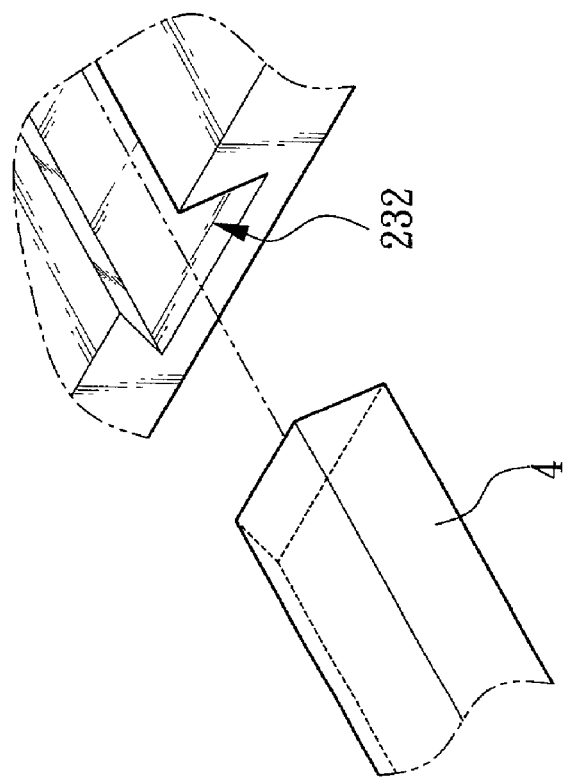
FIG. 7C is an illustration of three-dimensional structure for the third preferable embodiment of the present invention of which the gliding groove matching with the calibration film.
Figure 7E:
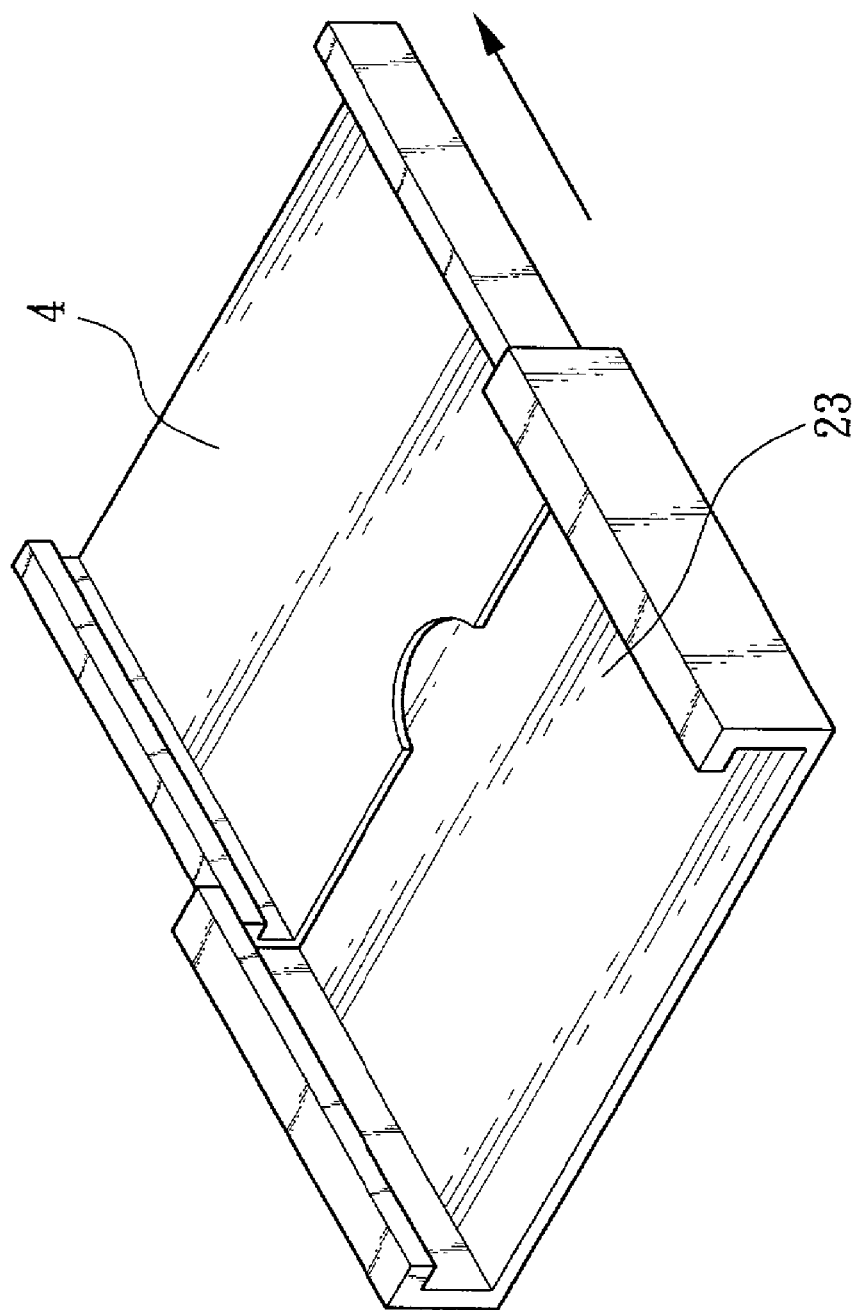
FIG. 7E is an illustration of three-dimensional structure for the fifth preferable embodiment of the present invention of which the gliding groove matching with the calibration film.

Please refer to FIG. 6A and FIG. 6B, which are illustrations for preferable embodiments of a single attachment with a changeable manner for the calibration film arranged in small mask of the present invention. The small mask 7 is comprised of a lamp tube 71, which provides light source, an arc upper lid 72, which provides for focusing and reflecting the light source, a base seat 73, which is matched with the arc upper lid 72 for accommodating the lamp tube 71, wherein an open groove 731 is further arranged at the base seat 73 for the light source to pass through, and a gliding groove 232c, which is matched with the calibration film 4 and capable of providing for the calibration film 4 to make displacement motion inside the gliding groove 232b to achieve the function of changing. The execution of the mechanism variation of such kinds may be presented as following. When executing scanning job with small mask 7, an auxiliary frame 6a is arranged between the small mask 5 and the outer shell 11. The transmission-typed document 31 may be placed inside the auxiliary frame 6a. The light provided by the small mask 7 is incident upon the transmission-typed document 31 and catches the image signals by an optical chassis 14. The attachment 23b is arranged on the auxiliary frame 6a. The design of attachment 23b may also be a gliding groove 232d, of which shape is matched with the calibration film 4 to provide displacement motion for the calibration film 4 inside the gliding groove 232d for achieving the function of changing. Of course, it may also be executed with the manner of pasting. From above mechanism, it may provide a light source for scanning the transmission-typed document and functions for scanning and correcting the transmission-typed document.

Please refer to FIG. 7A through FIG. 7E, which are illustrations of three-dimensional structure for the preferable embodiments of the present invention of which the gliding groove matching with the calibration film 4. Wherein, when the calibration film 4 is a long stripe, the design of the gliding groove 232 is that at least one convex block 2321 is arranged on the gliding groove for fixing the calibration film 4. The design of the convex block 2321 may be a shape of square or semi-circular. Of course, it may also be other shape, as long as it may achieve this function. All these variations according to above description may be executed easily by those who are skilled in these kinds of arts. As for the embodiment of the present invention, the matches of the gliding groove 232 and the calibration film 4 may also be shapes of pigeon tail or swallow tail or other objects. Wherein, the calibration film 4 may also be placed inside the attachment 23 and capable of being taking out. The application of such kinds of mechanism variation is well known to those who are skilled at the arts and still within the structure patent of the invention, so repetitious description is no more present herein.

What is claimed is:

1. An optical scanner, comprising:
   a light source to provide light incident upon a transmission document for generating image signals;
   an optical chassis capable of receiving at least a portion of the image signals;
   a scanning zone to position the transmission-typed document;

a plug-in calibration film coupled to the optical scanner, wherein the plug-in calibration film is configured to transmit at least a portion of the image signals; and at least one attachment for the plug-in calibration film formed on the optical chassis.

2. The optical scanner claim 1, wherein the attachment comprises a recess, and the plug-in calibration film is connected with the recess by pasting.

3. The optical scanner of claim 1, wherein the attachment comprises a gliding groove, of which shape is matched with the plug-in calibration film to provide a displacement motion for the plug-in calibration film inside the gliding groove.

4. The optical scanner of claim 1, wherein the plug-in calibration film comprises a positive plug-in calibration film.

5. The optical scanner of claim 1, wherein the plug-in calibration film comprises a negative plug-in calibration film.

6. A method, comprising:

providing light incident upon a plug-in calibration film to generate image signals;

receiving, at an optical chassis, at least a portion of the image signals; and adjusting the optical chassis, based at least in part on the received image signals.

7. The method of claim 6, wherein adjusting comprises adjusting the optical chassis to obtain a desired brightness for the image signals.

8. The method of claim 7, further comprising executing a scan of a transmission document after the adjusting.

9. The method of claim 7, wherein the calibration film comprises a positive calibration film.

10. The method of claim 7, wherein the calibration film comprises a negative calibration film.

11. The method of claim 7, wherein the optical chassis comprises a portion of an optical scanner.

* * * * *